United States Patent
Wu et al.

(10) Patent No.: US 11,346,781 B2
(45) Date of Patent: May 31, 2022

(54) OPTICAL FIBER LASER INDUCED BREAKDOWN SPECTROSCOPY DETECTION DEVICE AND METHOD

(71) Applicants: XI'AN JIAOTONG UNIVERSITY, Xi'an (CN); SUZHOU NUCLEAR POWERRESEARCH INSTITUTE CO., LTD, Suzhou (CN)

(72) Inventors: Jian Wu, Xi'an (CN); Zhi Zhang, Xi'an (CN); Yan Qiu, Xi'an (CN); Xingwen Li, Xi'an (CN); Yuhua Hang, Xi'an (CN); Tao Liu, Xi'an (CN); Fei Xue, Xi'an (CN)

(73) Assignees: XI'AN JIAOTONG UNIVERSITY, Xi'an (CN); SUZHOU NUCLEAR POWERRESEARCH INSTITUTE CO., LTD, Suzhou (CN)

( * ) Notice: Subject to any disclaimer, the term of this patent is extended or adjusted under 35 U.S.C. 154(b) by 0 days.

(21) Appl. No.: 17/043,720

(22) PCT Filed: Mar. 20, 2019

(86) PCT No.: PCT/CN2019/078908
§ 371 (c)(1),
(2) Date: Sep. 30, 2020

(87) PCT Pub. No.: WO2020/103361
PCT Pub. Date: May 28, 2020

(65) Prior Publication Data
US 2021/0364434 A1    Nov. 25, 2021

(30) Foreign Application Priority Data
Nov. 19, 2018 (CN) .......................... 201811377546.3

(51) Int. Cl.
*G01N 21/64* (2006.01)
*G01S 15/08* (2006.01)
*G21C 17/017* (2006.01)

(52) U.S. Cl.
CPC .......... *G01N 21/6402* (2013.01); *G01S 15/08* (2013.01); *G21C 17/017* (2013.01);
(Continued)

(58) Field of Classification Search
CPC ......... G01N 21/6402; G01N 2201/021; G01N 2201/06113; G01N 2201/0636; G01N 2201/08; G01S 15/08; G21C 17/017
See application file for complete search history.

(56) References Cited

U.S. PATENT DOCUMENTS 7,480,044 B2 * 1/2009 Leipertz .................... F01N 1/00
356/301
2012/0062874 A1  3/2012 Beckstead et al.

FOREIGN PATENT DOCUMENTS

| CN | 103743710 A | 4/2014 |
| CN | 106568761 A | 4/2017 |

(Continued)

OTHER PUBLICATIONS

Rai et al., "High temperature fiber optic laser-induced breakdown spectroscopy sensor for analysis of molten alloy constituents," 2002, Review of Scientific Instruments, vol. 73, No. 10 pp. 3589-9599. (Year: 2002).*

(Continued)

*Primary Examiner* — Kiho Kim
(74) *Attorney, Agent, or Firm* — W&G Law Group

(57) ABSTRACT

An optical fiber laser induced breakdown spectroscopy detection device and a detection method are provided. The device comprises an optical fiber LIBS detector and a master control detection system. The master control detection sys- (Continued)

tem is installed in the master control room of a nuclear power plant, and the optical fiber LIBS detector is configured to perform detection in a pipeline. The master control detection system and the optical fiber LIBS detector are connected to each other via the transmission optical fiber and the control signal line. The remote on-line detection of the positioning and fixed point of the designated area of the inner wall of the main pipeline of the nuclear power plant can be detected on line in the master control room of the nuclear power plant.

7 Claims, 7 Drawing Sheets

(52) U.S. Cl.
CPC .................. *G01N 2201/021* (2013.01); *G01N 2201/0636* (2013.01); *G01N 2201/06113* (2013.01); *G01N 2201/08* (2013.01)

(56) References Cited

FOREIGN PATENT DOCUMENTS

| CN | 206638627 U | 11/2017 |
|---|---|---|
| CN | 108362682 A | 8/2018 |
| WO | 03081287 A2 | 10/2003 |

OTHER PUBLICATIONS

Davies et al., "Quantitative analysis using remote laser-induced breakdown spectroscopy (LIBS)," 1995, Spectrochimica Acta Part B, vol. 50, pp. 1059-1075. (Year: 1995).*

Saeki et al., "Development of a fiber-coupled laser-induced breakdown spectroscopy instrument for analysis of underwater debris in a nuclear reactor core," 2014, Journal of Nuclear Science and Technology, vol. 51, Nos. 7-8, pp. 930-938. (Year: 2014).*

International Search Report (PCT/CN2019/078908); dated Aug. 21, 2019.

* cited by examiner

OPTICAL FIBER LASER INDUCED BREAKDOWN SPECTROSCOPY DETECTION DEVICE AND METHOD

CROSS-REFERENCE TO RELATED APPLICATIONS

The present application is based on International Application No. PCT/CN2019/078908, filed on Mar. 20, 2019, which claims priorities to Chinese Patent Application No. 201811377546.3, filed on Nov. 19, 2018, the contents of which are incorporated by reference in their entireties.

FIELD

The present disclosure belongs to the technical field of laser diagnosis, and relates to an optical fiber laser induced breakdown spectroscopy detection device and a detection method.

BACKGROUND

The technology of condition monitoring, maintenance and evaluation of key structures of reactors is an important support for the safety and economy of nuclear power. In order to ensure that there are no harmful defects and damages in the structure of nuclear power equipment after manufacture and operation, nuclear power related laws and regulations require nondestructive testing of key components of nuclear power equipment before and after service. Due to the harsh operating environment of nuclear power plants, such as high radioactivity, high temperature and high pressure, it is difficult to realize long-distance online measurement by conventional detection methods, such as X-ray photography, ultrasonic technology and eddy current technology. Recently developed remote on-line detection technologies such as acoustic emission technology and electrochemical technology also have their own limitations, for example, acoustic emission technology can only detect the pressure wave signal emitted by the material that is suffering from damages, but cannot evaluate and predict its life; and electrochemical technology needs to add small amplitude electrical signal disturbance to the nuclear power system, which may affect the system.

Laser induced breakdown spectroscopy (LIBS, hereinafter referred to as LIBS technology) is a measurement technology that uses the emission spectrum of laser-induced plasma generated on the surface of the material to be detected to quantitatively measure the elemental composition and mechanical parameters of the sample. Compared with other detection methods, the LIBS technology has obvious advantages: remote online in-situ detection, slight damage or even no damage to samples, no sample pretreatment, simultaneous analysis of multiple elements, etc.

The optical fiber transmission laser induced breakdown spectroscopy (hereinafter referred to as optical fiber LIBS technology) is an improvement and innovation of the previous traditional induced breakdown spectroscopy technology, and is more suitable for the detection task in extreme occasions: using optical fiber transmission laser to focus on the surface of the sample to form plasma, collecting the emission spectrum of the plasma, and analyzing it by spectral post-processing algorithm to determine the material composition and contents of the sample to be detected. This technology has great potential application value in nuclear power plants, maintenance enterprises of nuclear power plants, nuclear fuel manufacturing plants, spent fuel treatment plants and other places. Optical fiber LIBS technology can be used to detect the places which are difficult to reach manually, such as the main pipeline or the steam overheated bent pipeline in the production line with high temperature, high pressure and high radiation.

However, the developed optical fiber LIBS device also has the following shortcomings. On the one hand, the traditional portable optical fiber LIBS detection system cannot adapt to the working environment in the main pipelines of the nuclear power plant, and cannot go deep into the main pipelines of the nuclear power plant to remotely control and detect the designated area of the inner wall of the pipelines (for example, Huazhong University of Science and Technology, Zeng Xiaoyan, etc., portable laser probe composition analyzer based on fiber laser, [P], China, 2013107403189.2015104); on the other hand, since the energy density of bombarding a target material by the laser transmitted by optical fiber LIBS technology is generally lower than that of traditional LIBS, it leads to poor element sensitivity and element detection limit, which causes insufficient detection ability, or even failure, for some key elements. In order to solve this problem, it is necessary to create a special gas medium environment according to the detection requirements for specific elements, improve the signal-to-background ratio of spectral signals, and improve the detection sensitivity of key elements. At present, China has not yet established a laser-induced spectrum database for nuclear power plant steel or a quantitative measurement method for its elemental composition. In addition, in terms of detection instruments and equipment, aiming at the harsh working environment such as complex radiation field, high temperature and high humidity, the LIBS system, which can realize remote control and reliable operation, still needs further development.

SUMMARY

The object of the present disclosure is to overcome the shortcomings of the prior art, and provide an optical fiber laser induced breakdown spectroscopy detection device and a detection method, which combine the on-board control system of the detector with the optical fiber LIBS technology, focus on the laser breakdown surface to collect spectra based on an imaging mode, and are mainly used for qualitatively and quantitatively analyzing and measuring the elemental composition of the inner wall material of the main pipeline, in such a manner that the detection of the chemical composition and mechanical property changes of the main pipeline material under the shutdown maintenance environment of a nuclear power plant can be realized.

In order to achieve the above object, the disclosure adopts the following technical solution:

An optical fiber laser induced breakdown spectroscopy detection device includes an optical fiber LIBS detector and a master control detection system, the master control detection system is installed in a master control room of a nuclear power plant, the optical fiber LIBS detector is configured to enter a pipeline and perform detection in the pipeline and the optical fiber LIBS detector and the master control detection system are connected with each other via a transmission optical fiber and a control signal line.

The optical fiber LIBS detector includes a lifting platform installed with a rotational mechanism thereon, a telescopic mechanism is connected to the rotational mechanism, and an optical fiber LIBS probe is installed at an end of the telescopic mechanism. A lifting driving mechanism is provided at a bottom of the lifting platform and at least one moving component is installed at a bottom of the lifting driving mechanism. The optical fiber LIBS probe is connected to one end of the transmission optical fiber.

A radial distance sensor, an illuminating lamp and a camera are installed at a joint of the telescopic mechanism and the optical fiber LIBS probe. A rotation stopper is provided at a joint of the rotational mechanism and the telescopic mechanism.

The optical fiber LIBS probe includes a probe external cavity and a probe internal cavity that are connected and fixed through a threaded structure at a tail portion. An external regulator is provided at a head portion of the probe external cavity. An internal regulator is provided at a head portion of the probe internal cavity. An optical fiber connector is installed at a tail portion of the probe internal cavity, and a probe plano-convex lens is fixedly installed in the internal regulator through a snap ring. An external stop ring is provided between the external regulator and the probe external cavity, and an internal stop ring is provided between the internal regulator and the probe internal cavity. Two air nozzles are symmetrically arranged on a side surface of the external regulator.

The optical fiber connector, the probe plano-convex lens and the external regulator are arranged on a same optical path, and centers of the optical fiber connector, the probe plano-convex lens and the external regulator are located on a same straight line. The probe plano-convex lens has a diameter of 25.4 mm and a focal length of 16 mm.

The at least one moving component includes two lateral driving wheels and two driven wheels, each of the two lateral driving wheels is provided with a side wheel driving mechanism thereon; each of the two lateral driving wheels and the two driven wheels is connected to a bottom plate of the lifting driving mechanism through a wheel telescopic rod; a forward distance sensor is installed at a front end of the bottom plate of the lifting driving mechanism, and a lateral distance sensor is mounted on a side surface of the bottom plate.

Openings of the two air nozzles are opposite to each other, and the two air nozzles are connected with a same air bottle and a same regulating valve. Airflows from external air pipes have a same flow rate and confront each other at a central position inside the external regulator, the speed of the airflows is buffered at the central position, and the airflows move along an axial direction of the external regulator in such a manner that a position where laser light is focused on an inner surface of a pipeline to be detected is in a gaseous medium environment. The external regulator is provided with an opening of 90° in a direction perpendicular to a straight line where the two air nozzles are located in such a manner that air in the external regulator overflows from the opening.

The master control detection system includes a nanosecond laser, and a first beam splitter, a second beam splitter and a dichroic mirror that are sequentially arranged along an output light path of laser light of the nanosecond laser. The laser light is reflected by the dichroic mirror and then enters an optical fiber coupler, is focused by a first plano-convex lens of the optical fiber coupler and transmitted in the transmission optical fiber, and then enters the optical fiber LIBS detector to be focused on a pipeline to be detected; plasma emission photons generated after laser focusing and shooting are emitted along a reversible optical path, a laser output end of the transmission optical fiber becomes a photon input end, and a laser input end of the transmission optical fiber becomes a photon output end in such a manner that photon beams are emitted from the photon output end of the transmission optical fiber and become parallel light through the first plano-convex lens, the parallel light is transmitted through the dichroic mirror, focused into a collecting optical fiber through the second plano-convex lens and is then input into a spectrometer through the collecting optical fiber; the spectrometer is electrically connected to a computer interacting with a control module, and the control module is connected to the optical fiber LIBS detector through the control signal line.

A photoelectric detector is provided on a reflected light path of a first beam splitter and electrically connected to an oscilloscope, and the oscilloscope is electrically connected to an ICCD; a laser energy meter is provided on a reflected light path of a second beam splitter; and each of the nanosecond laser, the ICCD and the spectrometer is connected to a programmable pulse delay generator.

The transmission optical fiber is a multimode optical fiber coated with high temperature-resistant polyimide, and a protective tube for packaging the multimode optical fiber is made of a stainless steel material. The transmission optical fiber has an outer diameter of 6 mm, a core diameter of 600 μm, a numerical aperture of 0.22, a cladding diameter of 660 μm, and a coating diameter of 710 μm, a wavelength range of transmittable laser ranging from 185 nm to 1100 nm, and a maximum power density of 1 $GW/cm^2$; and the collecting optical fiber is a silica-clad multimode optical fiber with a length of 1 m, a core diameter of 400 μm and a numerical aperture of 0.22.

The telescopic mechanism is installed at a center of a turntable of the rotational mechanism, and the telescopic mechanism is driven to rotate on the an xOz plane by controlling the rotational mechanism in such a manner that detection work in different directions at a same position in the pipeline to be detected is satisfied; the rotation stopper is installed just below the turntable of the rotation mechanism; each of a radial distance sensor, a lateral distance sensor and a forward distance sensor is a high-frequency ultrasonic probe; each of the side wheel driving mechanism, the lifting driving mechanism, the rotational mechanism and the telescopic mechanism is sealed and packaged with the stainless steel material; and other structures of the optical fiber LIBS detector are all made of the stainless steel material.

A method for optical fiber laser induced breakdown spectroscopy detection includes: step 1 of adjusting detector; step 2 of positioning the detector; and step 3 of analyzing and processing detection.

The adjusting detector includes: firstly, selecting an external regulator with appropriate size and model based on a nominal inner diameter of the pipeline to be detected; adjusting lengths of four wheel telescopic rods, and adjusting an included angle between a plane of the bottom of the lifting platform and each of the four wheel telescopic rods located at both sides, in such a manner that two lateral driving wheels and two driven wheels closely fit with an inner wall of the pipeline to be detected; judging whether values measured by two lateral distance sensors are the same or not, and if not, further adjusting the four wheel telescopic rods until the values measured by the two lateral distance sensors are the same and the optical fiber LIBS detector is located at a central position of the pipeline in an X direction; elongating the telescopic mechanism in such a manner that the optical fiber LIBS detector closely fits with the inner wall surface just above the pipeline to be detected; setting the nanosecond laser in an internal trigger working mode, setting a gate width and a time delay of the ICCD on the computer, and observing whether an intensity of collected element characteristic line radiation spectrum is maximum or not; if not, adjusting an object distance by adjusting a position of an internal regulator in a probe internal cavity, and adjusting an image distance by finely adjusting a position of an external regulator in a probe external cavity, repeating these steps for multiple times until an element spectral line with a maximum intensity is observed, and fixing the internal regulator and the external regulator.

The positioning the detector includes: controlling, by the computer, the lifting platform to go upward and downward, and controlling the lifting platform to go upward when a value measured by one of the two lateral distance sensors is smaller than a value measured by the radial distance sensor, and controlling the lifting platform to go downward when the value measured by the lateral distance sensor is larger than the value measured by the radial distance sensor, in such a manner that the optical fiber LIB S detector is located in a center of the pipeline in a Z direction and a center of a turntable of the rotational mechanism is located at the center of the pipeline to be detected; remotely controlling, by of the computer, the illuminating lamp to be turned on, adjusting the telescopic rod to elongate or contract, and automatically adjusting a focal length of a camera by the computer, in such a manner that an image of the inner wall of the pipeline to be detected is clearly observed on the computer; setting rotating speeds of two side wheel driving mechanisms to be the same, and controlling the optical fiber LIBS detector to linearly advance along the inner wall of the pipeline to be detected; setting a proper turning threshold in a control program of a computer, and when a value measured by a forward distance sensor is smaller than the turning threshold, determining that the optical fiber LIBS detector enters a turning section of the pipeline to be detected; at this moment, if a value measured by a left one of the two lateral distance sensors is greater than a value measured by a right one of the two lateral distance sensors, setting, by a program of the computer, that the rotating speed of a right one of the two side wheel driving mechanisms is greater than the rotating speed of a left one of the two side wheel driving mechanisms, in such a manner that the optical fiber LIBS detector turns left and vice versa; controlling the optical fiber LIBS detector to advance in the pipeline to be detected until the detector reaches a position to be detected of the inner wall of the pipeline, controlling, by the computer, the rotational mechanism to rotate and to drive the camera located on the telescopic mechanism to rotate on an xOz plane until an area to be detected falls in a middle of an image captured by the camera, and tuning off the illuminating lamp; manipulating the rotational mechanism to rotate at a fixed angle in such a manner that the optical fiber LIBS probe is rotated to a position where the camera is located, and adjusting the telescopic rod to extend until the external regulator closely fits with the inner wall of the pipeline to be detected and the area to be detected is just in a middle of a contact curved surface.

The analyzing and processing detection includes: setting the nanosecond laser in an external trigger working mode, and controlling light emission of the nanosecond laser and a door opening signal of the ICCD by setting parameters of the programmable pulse delay generator; opening an air pipe switch and a regulating valve, in such a manner that medium air flows fill a required air medium into the optical fiber LIBS probe through two opposite air nozzles; sampling, by the spectrometer, environmental background spectrum before each measurement of the pipeline to be detected; in each measurement, emitting, by the nanosecond laser, 50 laser pulses at a frequency of 1 Hz, and transmitting the plasma spectrum that is generated every time when the laser breaks down the area to be detected of the inner wall of the pipeline to be detected to the spectrometer through the optical path; automatically accumulating, by the spectrometer, the collected 50 plasma luminescence spectra, and displaying them on the computer, automatically comparing obtained spectrum data with NIST standard spectrum database by a software, analyzing and obtaining types and spectral line intensities of elements in the area to be detected, selecting elements to be quantitatively analyzed, and automatically selecting, by the software, corresponding optimal available characteristic spectral lines, and modelling a calibration curve by combining with optical fiber LIBS standard sample databases of the nuclear power plant to determine contents of the elements in the area to be detected.

Compared with the prior art, the present disclosure has the following beneficial effects.

The master control detection system is installed in the master control room of the nuclear power plant, the optical fiber LIBS detector enters the main pipeline of the nuclear power plant to perform detection, and is connected with the control signal line through a high-temperature resistant high-power transmission fiber, so that the remote on-line detection for a fixed point of the designated area of the inner wall of the main pipeline of the nuclear power plant can be realized in the master control room of the nuclear power plant, the pipeline to be detected does not need to be pretreated, the inner wall of the pipeline is slightly damaged or even undamaged, and simultaneous rapid quantitative analysis of various elements can be realized, and the whole detection process is safe, reliable and efficient.

Further, the optical fiber LIBS detector of the present disclosure includes a sensing component, a moving component, a lifting component, a rotational component, a telescopic component and a camera component. A control program of the corresponding flow is designed, and by controlling the motor speed of the side wheel drive device, the lifting and lowering of the lifting platform, the rotation of the rotational mechanism, the extension and contraction of the telescopic rod, the switch of the illuminating lamp and the focal length of the camera, the omni-directional automatic detection in the main pipeline of the nuclear power plant can be realized during shutdown and maintenance.

A-optical fiber LIBS detector part of optical fiber LISB detection device; B-master control detection system of optical fiber LIBS detection device; 1-optical fiber LIBS probe; 2-illuminating lamp; 3-radial distance sensor; 4-camera; 5-telescopic mechanism; 6-rotational mechanism; 7-rotation stopper; 8-lifting platform; 9-lifting driving mechanism; 10-lateral distance sensor; 11-side wheel driving mechanism; 12-wheel telescopic rod; 13-driven wheel; 14-forward distance sensor; 15-lateral driving wheel; 16-transmission optical fiber; 17-optical fiber coupler; 18-first plano-convex lens; 19-laser energy meter; 20-dichroic mirror; 21-second plano-convex lens; 22-second beam splitter; 23-the first beam splitter; 24-photodetector 25-oscilloscope; 26-nanosecond laser; 27-ICCD; 28-spectrometer; 29-computer; 30-programmable pulse delay generator; 31-collecting optical fiber; 32-control module; 33-control signal line; 34-external regulator; 35-extenfalspacing ring; 36-internal regulator; 37-optical fiber connector; 38-probe internal cavity; 39-internal spacing ring; 40-probe external cavity; 41-probe plano-convex lens; 42-air nozzle; 43-plasma plume; 44-pipeline to be detected.

DESCRIPTION OF EMBODIMENTS

In order to enable a person skilled in the art to better understand the solution of the present disclosure, the technical solution in the embodiments of the present disclosure will be described clearly and completely with reference to the drawings in the embodiments of the present disclosure. Obviously, the described embodiments are only part of the embodiments of the present disclosure, not all of them. Based on the embodiments of the present disclosure, all other embodiments obtained by a person skilled in the art without creative effort shall fall into the scope of protection of the present disclosure.

It should be noted that the terms "first", "second", etc. in the description and claims of the present disclosure and the above drawings are used to distinguish similar objects, and are not necessarily used to describe a specific order or sequence. It shall be understood that the data thus used may be interchanged under appropriate circumstances, so that the embodiments of the disclosure described herein can be implemented in an order other than those illustrated or described herein. In addition, the terms "including" and "having" and any variations thereof are intended to cover non-exclusive inclusion. For example, a process, method, system, product or equipment including a series of steps or units are not necessarily limited to those steps or units explicitly listed, but may include other steps or units not explicitly listed or inherent to these processes, methods, products or equipment.

The disclosure will be described in further detail with reference to the accompanying drawings.

Figure 1:
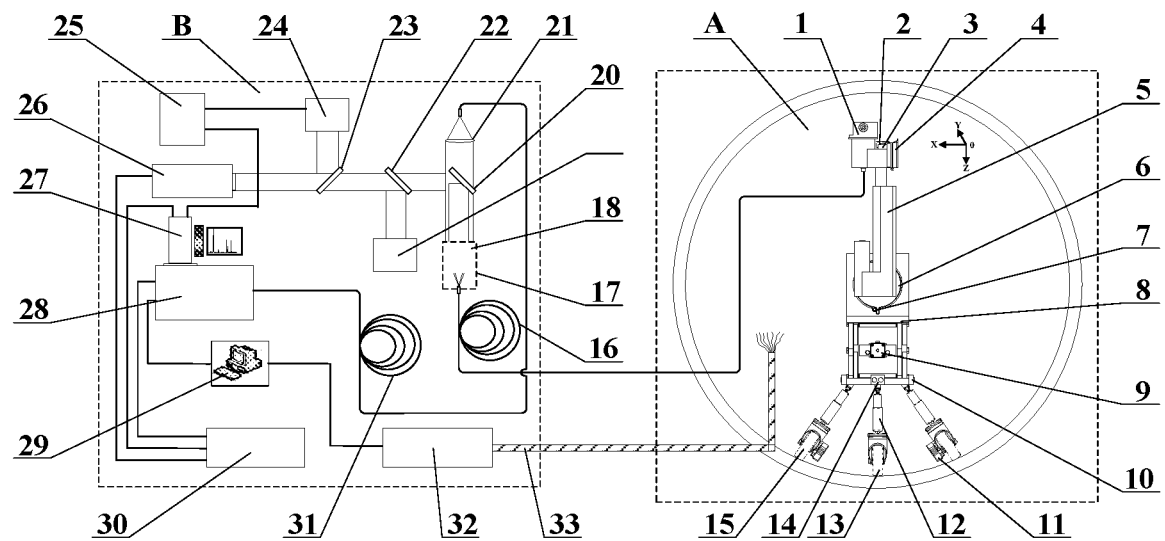
FIG. 1 is an overall diagram of an optical fiber laser-induced breakdown spectroscopy detection device.
Figure 2:
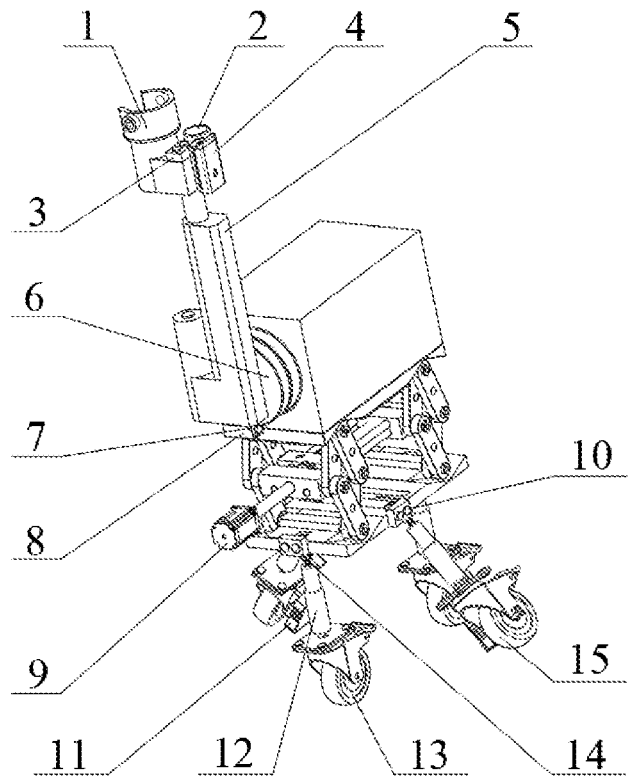
FIG. 2 is a three-dimensional diagram of an optical fiber LIBS detector.

Referring to FIG. 1, the optical fiber laser induced breakdown spectroscopy detection device of the present disclosure includes two parts, i.e., an optical fiber LIBS detector A and a master control detection system B. As shown in FIG. 2, the optical fiber LIBS detector A includes an optical fiber LIBS probe 1, an illuminating lamp 2, a radial distance sensor 3, a camera 4, a telescopic mechanism 5, a rotational mechanism 6, a rotation stopper 7, a lifting platform 8, a lifting driving mechanism 9, a lateral distance sensor 10, a side wheel driving mechanism 11, wheel telescopic rods 12, driven wheels 13, a forward distance sensor 14 and lateral driving wheels 15. The master control detection system B includes an optical fiber coupler 17, a first plano-convex lens 18, a laser energy meter 19, a dichroic mirror 20, a second plano-convex lens 21, a second beam splitter 22, a first beam splitter 23, a photoelectric detector 24, an oscilloscope 25, a nanosecond laser 26, ICCD 27, a spectrometer 28, a computer 29, a programmable pulse delay generator 30, a collecting optical fiber 31 and a control module 32. The master control detection system B is installed in a master control room of a nuclear power plant, and the optical fiber LIBS detector A enters the pipeline to perform detection, and the two are connected with each other via a transmission optical fiber 16 and a control signal line 33.

The transmission optical fiber 16 used in the disclosure is a multimode optical fiber coated with a high temperature resistant polyimide. The protective tube of the optical fiber package is made of stainless steel, an outer diameter of the transmission optical fiber is 6 mm, a fiber core of the transmission optical fiber has a diameter of 600 μm, a numerical aperture of the transmission optical fiber is 0.22, a cladding diameter of the transmission optical fiber is 660 μM, a coating diameter of the transmission optical fiber is 710 μm, a laser transmission wavelength of the transmission optical fiber ranges within 185 nm to 1100 nm, and a maximum power density of the transmission optical fiber is 1 GW/cm$^2$, and it can work in the environment having a temperature ranging from −190° C. to 350° C. for a long time, and is suitable for working in the high temperature and harsh environment in the main pipeline of the nuclear power plant during shutdown and maintenance. One end of the transmission optical fiber 16 is connected to the optical fiber coupler 17, and the other end is connected to the optical fiber LIBS probe 1. The transmission optical fiber 16 is configured to transmit laser energy and plasma emission photons. An appropriate length of the transmission optical fiber 16 can be selected as required to meet the requirements of the detection operation. The collecting optical fiber 31 in the master control detection system B is a silica-clad multimode optical fiber with a length of 1 m, an optical fiber core diameter of 400 μm and a numerical aperture of 0.22. Both ends of the transmission optical fiber 16 and the collecting optical fiber 31 are connected by SMA905 stainless steel optical fiber connectors. In actual uses, the transmission optical fiber 16 and the collecting optical fiber 31 with different models, lengths, diameters and numerical apertures can be replaced according to actual needs.

The nanosecond laser 26, the first beam splitter 23, the second beam splitter 22 and the dichroic mirror 20 that are included in the master control detection system B are all located on a same optical path, and the first beam splitter 23, the second beam splitter 22 and the dichroic mirror 20 each form an included angle of 45° with an output laser optical axis of the nanosecond laser 26. One path of the laser output by the nanosecond laser 26 passes through the first beam splitter 23 and another path thereof is split into the photoelectric detector 24 for monitoring the action signal of the output laser. One path of the laser transmitted through the first beam splitter 23 continuously transmits through the second beam splitter 22, and another path thereof is split into the laser energy meter 19. The splitting ratio between the two beam splitters is measured in advance through experiments, so that the actual energy of the output laser of the nanosecond laser can be monitored.

The optical fiber coupler 17, the dichroic mirror 20 and the second plano-convex lens 21 are located on a same optical path, the optical fiber coupler 17 is installed on the reflecting surface side of the dichroic mirror 20, and the second plano-convex lens 21 is installed on the transmitting surface side of the dichroic mirror 20. The second plano-convex lens 21 has a diameter of 12.7 mm and a focal length thereof is 40 mm. The first plano-convex lens 18 in the optical fiber coupler 17 has a diameter of 12.7 mm and a focal length of 100 mm. Both the second plano-convex lens 21 and the first plano-convex lens 18 are parallel to the optical axis of the output laser of the nanosecond laser 26.

The nanosecond laser 26 used in the present disclosure is an Nd: YAG nanosecond laser, which has an outgoing light with a wavelength of 1064 nm, a working frequency ranging from 1 Hz to 10 Hz, a pulse width FWHM of 10 ns, a maximum pulse energy of 150 mJ, and a laser beam diameter of 6 mm.

The dichroic mirror 20 is a short-wavelength pass dichroic mirror with a diameter of 50.8 mm and a cutoff wavelength of 805 nm. For the light with a wavelength ranging from 830 nm to 1300 nm, the reflectivity of the dichroic mirror 20 can reach more than 96%. For light with a wavelength ranging from 400 nm to 792 nm, the light transmittance can still reach more than 90%.

The laser with a wavelength of 1064 nm output by the nanosecond laser 26 is reflected by the dichroic mirror 20 and then enters the optical fiber coupler 17, and is focused by the first plano-convex lens 18 into the transmission fiber 16 with high temperature resistance for transmission and with a high-power, and then enters the optical fiber LIBS probe 1 to be focused on the pipeline 44 to be detected. On another hand, the plasma emission photons generated after each time of laser focused targeting are emitted from the optical fiber LIBS probe 1 along a reversible optical path. At this moment, the laser output end of the transmission optical fiber 16 becomes a photon input end, and the laser input end of the transmission optical fiber 16 becomes a photon output end. The light beam emitted from the photon output end of the transmission optical fiber 16 is changed into parallel light by the first plano-convex lens 18, and the parallel light can pass through the dichroic mirror 20, be focused into the collecting optical fiber 31 by the second plano-convex lens 21, and then be input into the spectrometer 28.

FIG. 2 is a three-dimensional diagram of the optical fiber LIBS detector A. The optical fiber LIB S detector A includes a sensing component, a moving component, a lifting component, a rotational component, a telescopic component and a camera component.

The sensing component described in the present disclosure includes the radial distance sensor 3, the lateral distance sensor 10 and the forward distance sensor 14. The radial distance sensor 3 is installed at the front end of the telescopic rod of the telescopic mechanism 6 and is configured to detect the distance between the optical fiber LIBS probe and the inner wall of the pipe 44 to be detected. The lateral distance sensor 10 is configured to measure the distance between the optical fiber LIBS detector A and the left and right side walls of the pipe to be detected 44 in such a manner that whether the optical fiber LIBS detector A is in the central position of the pipe to be detected 44 is judged. The forward distance sensor 14 is configured to detect the distance between the optical fiber LIB S detector A and the inner front wall of the pipe 44 to be detected in its traveling direction in such a manner that whether the optical fiber LIB S detector A reaches the turning position of the pipe 44 to be detected is judged.

The moving component described in the present disclosure includes the side wheel driving mechanism 11, the wheel telescopic rods 12, the driven wheels 13 and the side driving wheels 15. One end of the wheel telescopic rod 12 installed before and after the optical fiber LIBS detector A is connected with the driven wheels 13, and the other end is fixed on the lifting platform 8, and the rod body thereof and the bottom plane of the lifting platform 8 are fixed at an included angle of 90°. One end of each of the wheel telescopic rods 12 installed on the left and right sides of the optical fiber LIBS detector A is connected to the lateral driving wheel 15, and the other end is connected to the adjusting screw of the lifting platform 8. When the adjusting screw is loosened, the rod body can be adjusted on the xOz plane, and the included angle between the rod body and the bottom plane of the lifting platform 8 can be changed, and the angle and position of the wheel telescopic rods 12 on both sides can be fixed by tightening the adjusting screw.

The four wheel telescopic rods 12 connected with the two lateral driving wheels 15 and the two driven wheels 14 can be telescopically adjusted in the rod body direction, and the included angle between the wheel telescopic rods 12 on both sides and the bottom plane of the lifting platform 8 can also be adjusted. According to the pipes 44 to be tested with different diameters, the two lateral driving wheels 15 and two driven wheels 14 can be brought into full contact with the inner wall of the pipe 44 to be detected by the above-mentioned adjustment method, so that the optical fiber LIBS detector A is uniformly stressed when being placed in the pipe 44 to be detected, thereby avoiding the phenomenon of slipping in the process of traveling in the pipe.

The two lateral driving wheels 15 are both equipped with lateral driving mechanisms 11, and the two lateral driving machines 11 respectively drive the two lateral driving wheels 15 to rotate through motors, and then drive the front and rear driven wheels 14 to roll in the pipeline. When the rotating speeds of the two lateral driving wheels 15 are the same, the optical fiber LIBS detector A advances along a straight line. If the rotating speed of the left lateral driving wheel is greater than the rotating speed of the right lateral driving wheel, the optical fiber LIBS detector A turns right; if the speed of the right side drive wheel is greater than the rotating speed of the left side drive wheel, the optical fiber LIBS detector turns left.

The lifting component in the present disclosure includes a lifting platform 8 and a lifting driving mechanism 9. When the motor in the lifting drive mechanism 9 rotates in the forward direction, the lifting platform 8 rises; and when the motor in the lifting drive mechanism 9 rotates in the reverse direction, the lifting platform 8 descends. After adjusting the posture of the optical fiber LIBS detector A in the left-right direction, the optical fiber LIBS detector A is placed at the center of the whole pipeline by adjusting the lifting and lowering of the lifting platform 8, that is, the center of the turntable of the rotational mechanism 6 is placed at the center of the pipeline 44 to be detected.

The rotating component described in the present disclosure includes a rotational mechanism 6 and a rotation stopper 7. The rotational mechanism 6 is installed on the lifting platform 8, and the telescopic mechanism 5 is installed at the center of the turntable of the rotational mechanism 6. The telescopic mechanism 5 can be driven to rotate on the xOz plane by controlling the rotational mechanism 6, so as to satisfy the detection work in different directions at the same position in the pipeline 44 to be detected. The rotation stopper 7 is installed right below the turntable of the rotational mechanism 6. When the turntable starts to rotate from the position of the rotation stopper 7 and touches the rotation stopper 7 again after rotating 360° clockwise, it can only rotate counterclockwise in the opposite direction. Similarly, when the turntable rotates counterclockwise, the telescopic mechanism 5 is prevented from rotating indefinitely in the same direction, which avoids to damage the transmission optical fiber 16.

The telescopic assembly described in the present disclosure is a telescopic mechanism 5. The front end of the telescopic rod of the telescopic mechanism 5 is provided with a radial distance sensor 3, the left side of the telescopic rod is provided with a camera 4, the right side of the telescopic rod is provided with an optical fiber LIBS probe 1, and the rear side of the telescopic rod is provided with an illuminating lamp 2. During detection, the telescopic rod of the telescopic mechanism 5 is extended in such a manner that the optical fiber LIBS probe 1 closely fits with the inner wall surface of the pipe 44 to be detected.

The camera component described in the present disclosure includes the camera 4 and the illuminating lamp 2. The camera 4 is an auto-zoom camera. When the optical fiber LIBS detector A moves in the pipe 44 to be detected, the illuminating lamp 2 is turned on to take and observe the image of the inner wall of the pipe 44 to be detected. On the other hand, the distance between the camera 4 and the inner wall of the pipe 44 to be detected can be adjusted by controlling the extension and contraction of the telescopic rod in such a manner that the inner wall surface falls at the focal position of the camera 4, thereby can be clearly and remotely observing the image of the inner wall of the pipe 44 to be detected on the computer 29 in the master control room.

Figure 3:
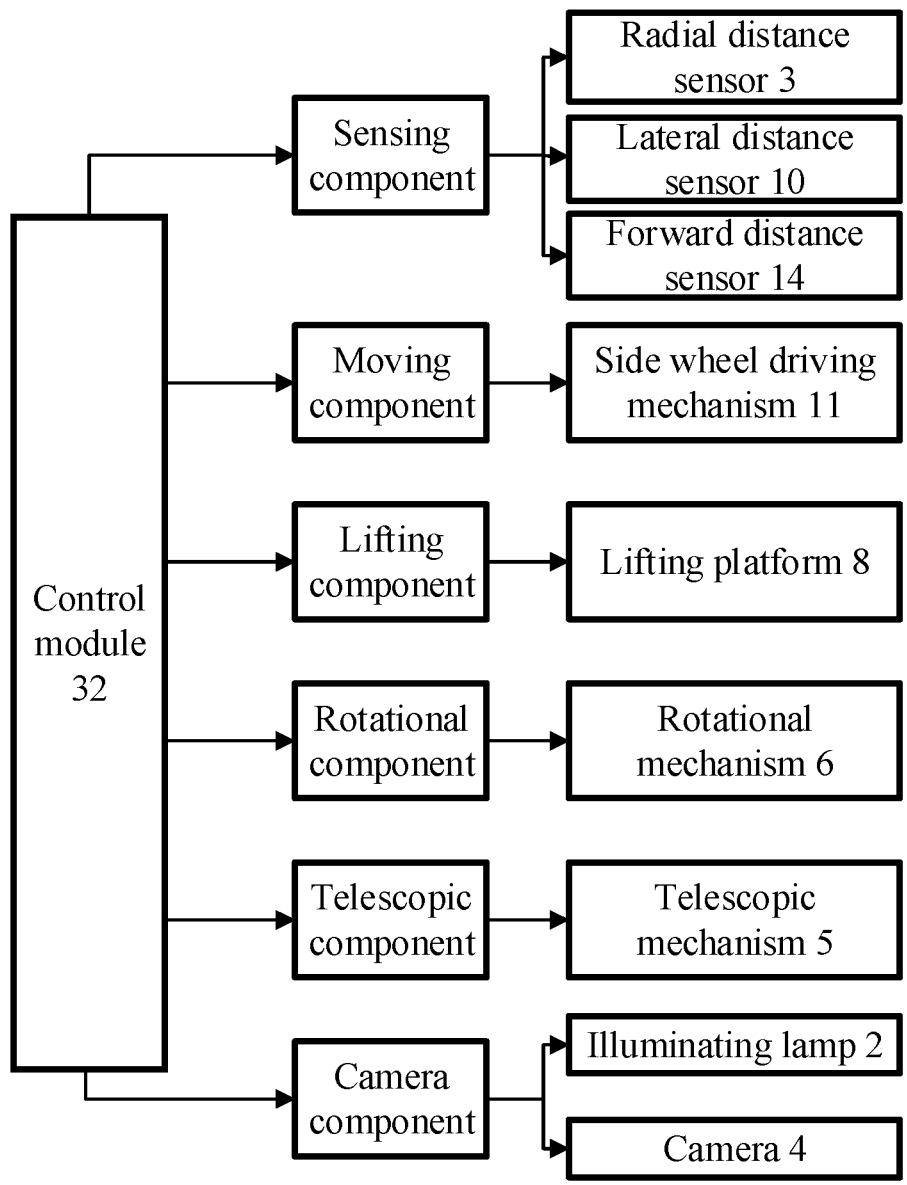
FIG. 3 is a block diagram of signal connection between a control module and an optical fiber LIBS detector.

FIG. 3 is a block diagram of signal connection between the control module 32 and the optical fiber LIBS detector A. The control module 32 is connected with the optical fiber LIBS detector A through a control signal line 33. The control signal line 33 includes the circuit connection line between the control module 32 and each one of the radial distance sensor 3, the lateral distance sensor 10, the forward distance sensor 14, the side wheel driving mechanism 11, the lifting driving mechanism 8, the rotational mechanism 6, the telescopic mechanism 5, the illuminating lamp 2, and the camera 4. The control module 32 is connected to the computer 29. The radial distance sensor 3, the lateral distance sensor 10 and the forward distance sensor 14 feed back the measured distance information to the computer 29 through the control module 32. The computer 29 monitors the rotating speeds of the two side driving wheels 15 and sends instructions to the control module 32 to control the two side driving mechanisms 11 to adjust the rotating speeds. The lifting driving mechanism 8 is controlled by the computer 29 to control the lifting direction and a speed of the lifting platform 8, and the height information of the lifting platform 8 will be fed back to the computer 29. The computer 29 controls the rotation start, rotation stop and rotation direction of the rotational mechanism 6, and the rotational mechanism 6 feeds back the rotation angle information of the turntable to the computer 29. The extension start, extension stop and extension direction of the telescopic mechanism 5 are controlled by a computer 29. The focal length of the camera 4 can be automatically adjusted by the computer 29 to control the switch of the illuminating lamp 2, which is convenient for the camera 4 to capture images of the inner wall surface of the pipeline 44 to be detected.

Since some liquid still exists in the main pipeline of the nuclear power plant during shutdown and maintenance, waterproof cables are used for the control signal line 33; the radial distance sensor 3, the lateral distance sensor 10 and the forward distance sensor 14 of the optical fiber LIBS detector A are all high-frequency ultrasonic probes; the side wheel driving mechanism 11, the lifting driving mechanism 8, the rotational mechanism 6 and the telescopic mechanism 5 are all sealed and packaged by stainless steel materials; and other structures of the optical fiber LIBS detector A are all made of stainless steel.

Figure 4:
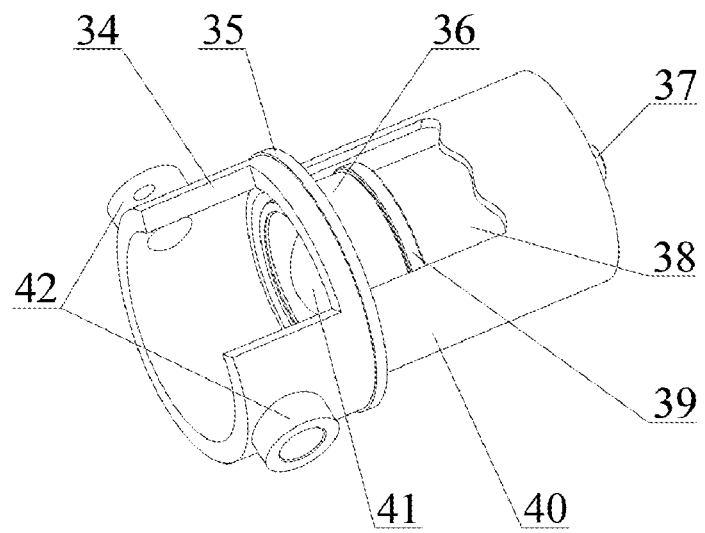
FIG. 4 is a schematic diagram of an optical fiber LIBS probe;)

FIG. 4 is a specific diagram of the optical fiber LIBS probe 1. The optical fiber LIBS probe 1 includes an external regulator 34, an external stop ring 35, an internal regulator 36, an optical fiber connector 37, a probe internal cavity 38, an internal stop ring 39, a probe external cavity 40, a probe plano-convex lens 41 and air nozzles 42.

The external regulator 34 is the head of the optical fiber LIBS probe, and closely fits with the inner wall surface of the pipe 44 to be detected during detection. The optical fiber connector 37 is the tail of the optical fiber LIBS probe, and is connected with the transmission optical fiber 16 through a SMA joint. The probe external cavity 40 and the probe internal cavity 38 are connected and fixed through a screw structure at the tail. The fiber optical connector 37 is installed at the tail of the probe internal cavity 38. The probe plano-convex lens 41 is fixedly installed in the internal regulator 36 through a snap ring. The external regulator 34 is installed at the head of the probe external cavity 40. The optical fiber connector 37, the probe plano-convex lens 41 and the external regulator 34 are located on the same optical path, and the centers of the optical fiber connector 37, the probe plano-convex lens 41 and the external regulator 34 are located on the same line. The probe plano-convex lens 41 has a diameter of 25.4 mm and a focal length of 16 mm.

The center of the optical fiber connector 37 is arranged beyond one time of the focal length away from the center of the probe plano-convex lens 41. According to the convex lens imaging law, the laser output from the laser output end of the transmission optical fiber 16 will pass through the probe plano-convex lens 41, and converge to a focal point on the other side of the lens, which is just at the intersection point of laser focusing with the inner wall surface of the pipe 44 to be detected at the surface of the head of the external regulator 34. If U represents the object distance, V represents the image distance and f represents the focal length, then the relationship between the object distance U and the image distance V is as follows:

$$\frac{1}{U} + \frac{1}{V} = \frac{1}{f}.$$

The whole outer surface of the probe cavity 38 is provided with external threads, and the internal regulator 36 is assembled on the head of the probe internal cavity 38 through a thread structure. By adjusting the position of the internal stop ring 39 on the probe internal cavity 38, the distance between the internal regulator 36 and the optical fiber connector 37, that is, the distance between the center of the probe plano-convex lens 41 and the center of the laser output end of the transmission optical fiber 16, i.e. the object distance U, is adjusted.

The head of the probe external cavity 40 is machined with a small length of external threads, and the external regulator 34 and the external stop ring 35 are assembled on the head of the probe external cavity 40 through internal threads. To a certain extent, the distance between the external regulator 34 and the internal regulator 36, that is, the distance between the center of the head of the external regulator 40 and the center of the probe plano-convex lens 41, i.e. the image distance V, can be finely adjusted by adjusting the position of the external stop ring 35 on the head of the probe external cavity 40.

With the above method, after the object distance U is fixed, the image distance V is finely adjusted by adjusting the positions of the external regulator 34 and the external stop ring 35 in such a manner that the focus of the laser passing through the probe plano-convex lens 41 falls on the inner surface of the pipe 44 to be detected, thereby obtaining the best effect of laser-induced breakdown to form plasma.

After the laser breaks through the pipe 44 to be detected, the formed plasma emission photons will be focused at the center of the laser output end of the transmission optical fiber 16 through the probe plano-convex lens 41 along a reversible optical path. At this time, the laser output end of the transmission optical fiber 16 becomes a photon input end, and the plasma emission photons will be reversely transmitted to the master control detection system B along the transmission optical fiber 16.

Figure 5:
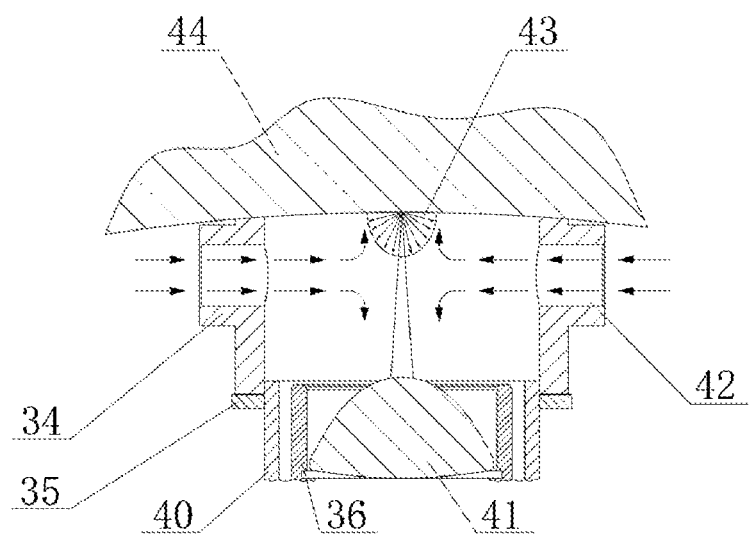
FIG. 5 is a schematic cross-sectional view of plasma plume induced by breakdown of the fiber LIBS probe fitting with the inner surface of the pipe to be detected.

FIG. 5 is a schematic cross-sectional view of plasma plume 43 induced by breakdown of the external regulator 34 in optical fiber LIBS probe 1 fitting with the inner surface of pipe 44 to be detected. The outer surface of the head of the external regulator 34 is designed to be in the shape of a cylindrical intersecting surface, and this design can ensure that it fits closely with the inner wall surface of the pipe 44 to be detected. According to the nominal inner diameter sizes of three kinds of pipes 44 to be detected, i.e., a hot section of the main pipe, a cold section of the main pipe and a fluctuating section of the main pipe of the nuclear power plant, different types of external regulators 34 with suitable fitting surface shapes are designed. In the process of using the optical fiber LIBS probe 1, external adjusters 34 of different models, shapes and sizes can be replaced according to the actual situation to meet the use requirements.

The left and right ends of the head of the external regulator 34 are respectively provided with the air nozzles 42, and each air nozzle 42 is connected with the external air bottle through an air nozzle joint and an air pipe. For the detection of nonmetallic elements in the main pipeline, it is necessary to fill the external regulator 34 with gaseous medium, such as argon (Ar), helium (He) and nitrogen (N2), through the air nozzle 42 to enhance the spectral intensity of LIB S, so as to improve the detection sensitivity and element detection limit. The flow rate of the gas medium will change the pressure near the inner surface of the pipe 44 to be detected, which will affect the plasma spectrum collected by the optical fiber LIBS system and the accuracy of the detection results. Therefore, the opening directions of the two air nozzles 42 are designed to be opposite to each other, and the two air nozzles are connected with the same air bottle and regulating valve. The air flows entering from the external air pipe have the same flow rate and confront with each other at the central position inside the external regulator 34. The air flow speed is buffered here, and the air flows will move along the axial direction of the external regulator 34, ensuring that the laser is focused on the inner surface of the pipeline 44 to be detected and always placed in the gas medium environment. In the direction perpendicular to the straight line where the two air nozzles 42 is located, the external regulator 34 is provided with an opening of 90° through which the gas in the outer regulator 34 can overflow.

Figure 6:
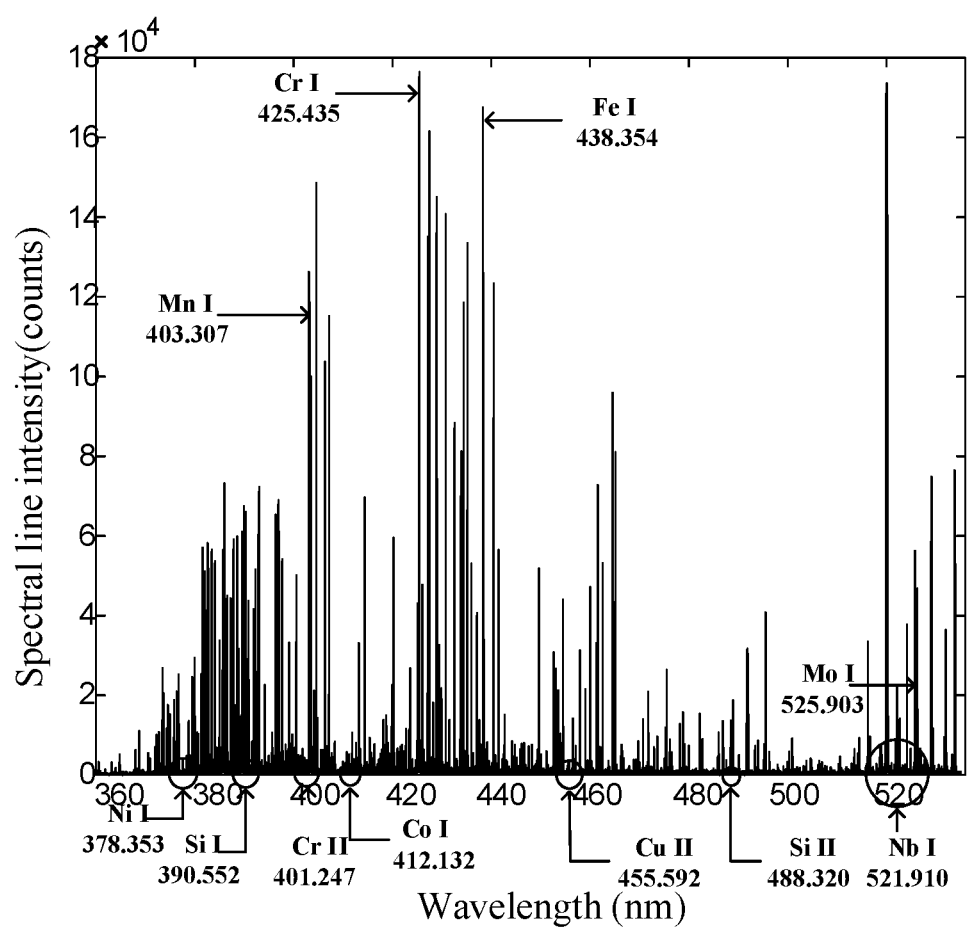
FIG. 6 is an accumulated spectrogram of Z3CN20-09M steel for a main pipeline of a nuclear power plant under 50 laser pulses.

FIG. 6 shows the cumulative spectrum of Z3CN20-09M steel used in the main pipeline of nuclear power plant under 50 laser pulses. The element spectral lines marked in the figure are all spectral lines without interference or self-absorption based on NIST database according to the actual optical fiber LIBS detection device. Most elements of Z3CN20-09M steel can be detected by the optical fiber LIBS detection device, such as Fe, Cr, Ni, Mn, mo, co, Cu, Nb, Si, etc. However, the spectral line intensity of trace elements (Mo, Si, Ni, Cu, Nb, Co) is weak.

The specific workflow of the present disclosure is as follows:

1: Detector Adjustment

Figure 7:
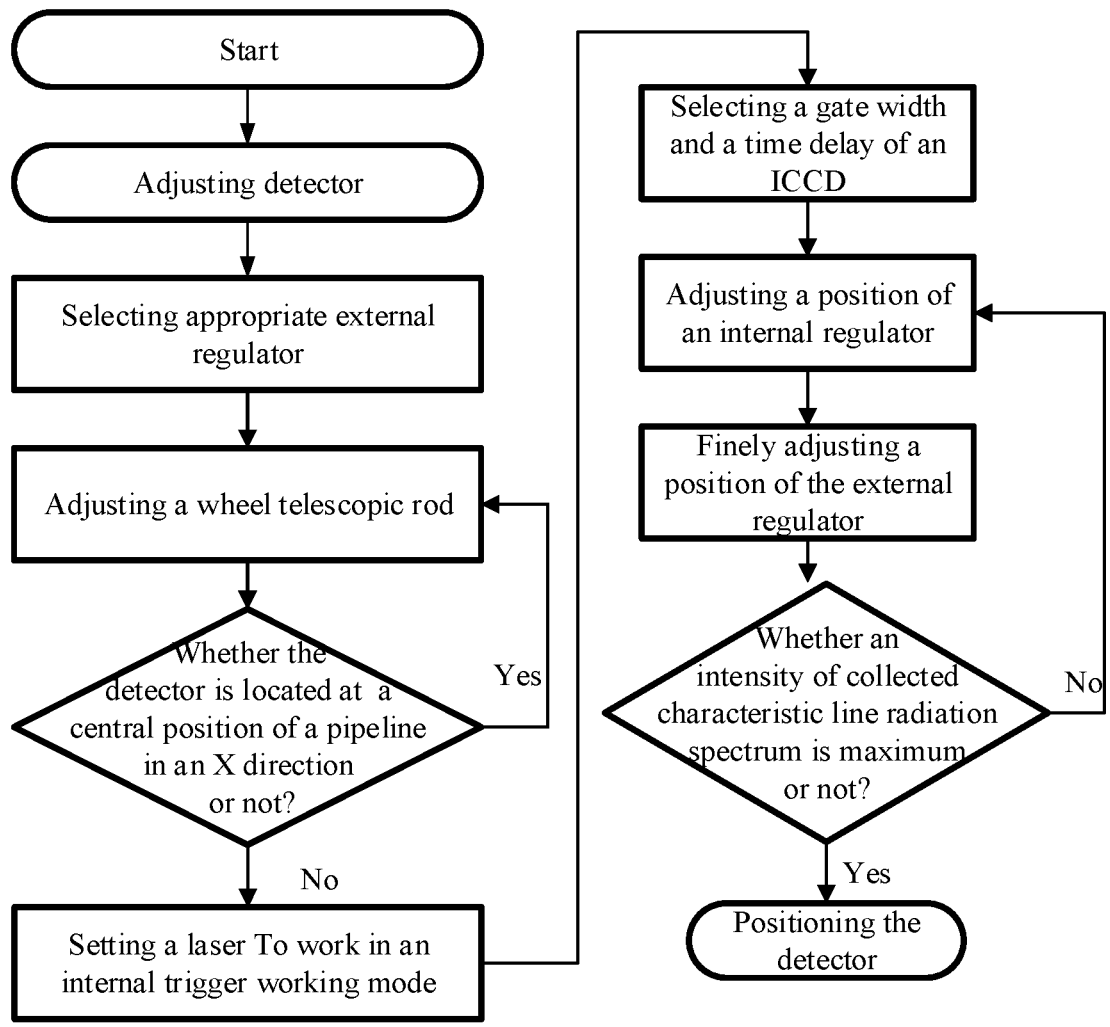
FIG. 7 is a working flowchart of the detector adjustment step of the optical fiber LIBS detection device.

As shown in FIG. 7 which illustrates the working flowchart of the adjusting the detector, firstly, the external regulator 34 with appropriate size and model is selected according to a nominal inner diameter of the pipeline 44 to be detected, lengths of four wheel telescopic rods 12 are adjusted, and the included angle between the bottom plane of the lifting platform 8 and each of the wheel telescopic rods 12 on both sides is adjusted in such a manner that the two lateral driving wheels 15 and the two driven wheels 14 each closely fit with the inner wall of the pipeline 44 to be detected. Whether values measured by the two lateral distance sensors 10 are the same is judged, and if not, the four wheel telescopic rods 12 are continuously adjusted to make the values of the two lateral distance sensors 10 the same, so as to ensure that the optical fiber LIBS detector A is located at the central position of the pipeline in an X direction; extending the telescopic rod 5, so that the optical fiber LIBS detector A closely fits with an inner wall surface just above the pipeline 44 to be detected. The nanosecond laser 26 is set in an internal trigger working mode; a gate width and a time delay of ICCD on the computer 29 is set; and whether an intensity of collected element characteristic line radiation spectrum is maximum is observed, and if not, the object distance U is adjusted by adjusting the position of the internal regulator 36 on the probe internal cavity 38 and an image distance V is adjusted by finely adjusting the position of the external regulator 42 on the probe external cavity 40, and these steps are repeated for multiple times until an element spectral line with a maximum intensity is observed, and the internal regulator 36 and the external regulator 42 are fixed.

2. Detector Positioning

Figure 8:
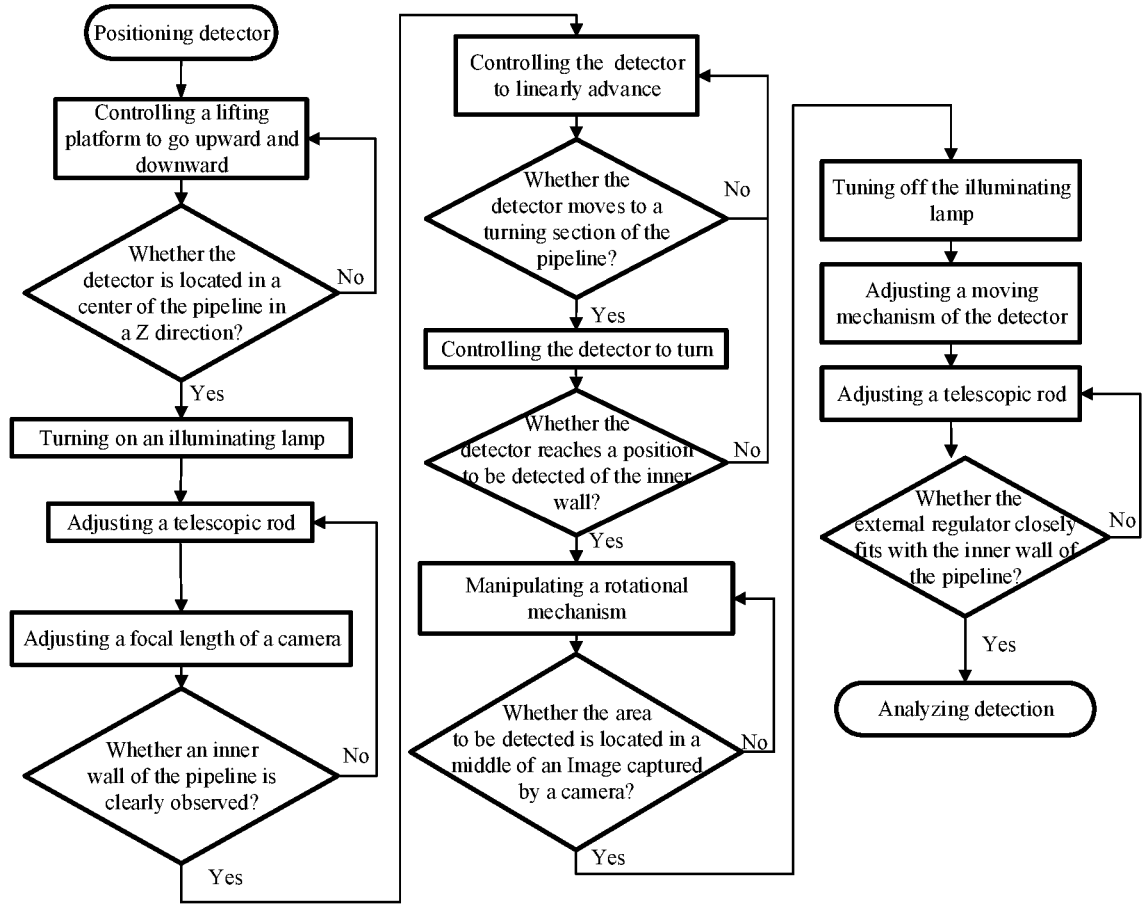
FIG. 8 is a working flowchart of the detector positioning step of the optical fiber LIBS detection device.

As shown in the flowchart in FIG. 8, after completing the detector adjusting step, the lifting platform 8 is controlled to go upward and downward by the computer 29, and if a value measured by the lateral distance sensor 10 is smaller than that of the radial distance sensor 3, the lifting platform 8 is controlled to go upward; and if the value measured by the lateral distance sensor 10 is greater than that of the radial distance sensor 3, the lifting platform 8 is controlled to go downward to ensure that the optical fiber LIBS detector A is located in the center of the pipeline in a Z direction, that is, the center of the turntable of the rotational mechanism 6 is located at the center of the pipeline 44 to be detected. The computer 29 remotely controls the illuminating lamp 2 to turn on and the telescopic rod 5 to extend and contract, and a focal length of the camera 4 is automatically adjusted by the computer 29, so that an image of the inner wall of the pipeline 44 to be detected can be clearly observed on the computer 29. The rotating speeds of the two side wheel driving mechanisms 11 are set to be the same, and the optical fiber LIBS detector A is controlled to linearly advance along the inner wall of the pipeline 44 to be detected. A proper turning threshold is set in a control program on a computer 29, and when a value measured by the forward distance sensor 14 is smaller than the turning threshold, it is regarded that the optical fiber LIBS detector A enters a turning section of the pipeline, and at this moment, if a value measured by the lateral distance sensor 10 on the left is greater than that of the lateral distance sensor 10 on the right, it is set that the rotation speed of the side wheel driving mechanism 11 on the right is greater than that of the side wheel driving mechanism 11 on the left in the program of the computer 29, so that the optical fiber LIBS detector A turns left and vice versa. In this way, the optical fiber LIBS detector A is controlled to travel in the pipeline to be detected 44 until the detector reaches a position to be detected of the inner wall of the pipeline, and the rotational mechanism 6 is controlled to rotate to drive the camera 4 located on the telescopic mechanism 5 to rotate on the xOz plane until an area to be detected falls in the middle of the image captured by the camera 4, and the illuminating lamp 2 is turned off. The rotational mechanism 6 is controlled to rotate a fixed angle to rotate the optical fiber LIBS probe 1 to the position where the camera 4 is located, and the telescopic rod 5 is adjusted to extend until the external regulator 34 closely fits with the inner wall surface of the pipeline 44 to be detected, and the area to be detected is just located in the middle of the contact curved surface.

3: Detection Analysis and Processing

Figure 9:
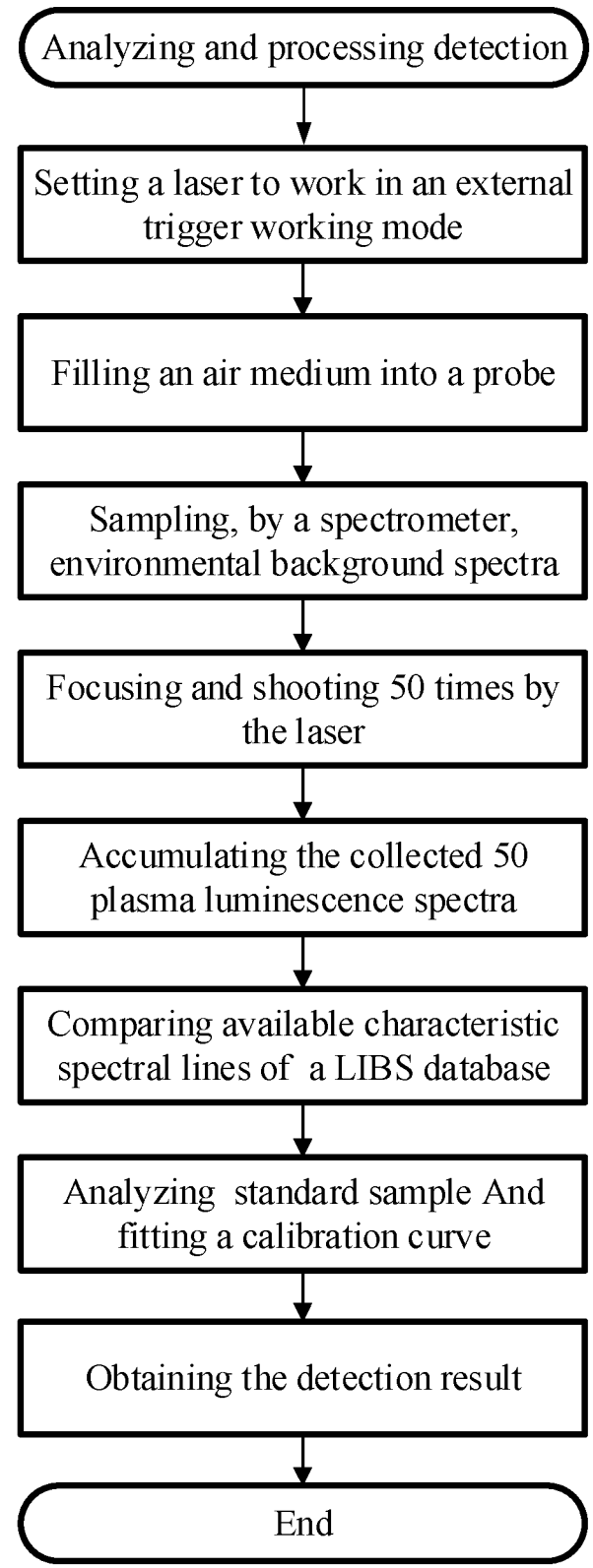
FIG. 9 is a working flowchart of the detection, analysis and processing step of the optical fiber LIBS detection device.

FIG. 9 is a working flowchart of the detection, analysis, and processing step of the optical fiber LIBS device after the detector completes the positioning step. The nanosecond laser 26 is set as an external trigger working mode, and light emission of the nanosecond laser 26 and a door opening signal of ICCD27 is controlled by setting parameters of the programmable pulse delay generator 30. An air pipe switch and the regulating valve are turned on in such a manner that medium air flows fill the required air medium into the optical fiber LIBS probe 1 through two opposite air nozzles 42. The spectrometer 28 samples environmental background spectra before each measurement of the pipeline 44 to be detected. In each measurement, the nanosecond laser 26 emits 50 laser pulses at a frequency of 1 Hz, and the plasma spectrum generated each time the laser breaks down the area to be detected of the inner wall of the pipeline 44 to be detected is transmitted to the spectrometer 28 through the optical path. The spectrometer 28 automatically accumulates collected 50 plasma luminescence spectra and the accumulated plasma luminescence spectra are displayed on the computer 29. The obtained spectrum data are automatically compared with NIST standard spectrum database by a software, and the types and spectral line intensities of various elements in the area to be detected are analyzed and obtained, the elements to be quantitatively analyzed are selected, and the software automatically selects corresponding optimal available characteristic spectral lines and models a calibration curve by combining with the optical fiber LIBS standard sample databases of the nuclear power plant to determine contents of the elements in the area to be detected.

The above content is only to illustrate the technical concept of the present disclosure, and cannot be used to limit the protection scope of the present disclosure. Any modification made on the basis of the technical solution according to the technical concept proposed by the present disclosure falls within the protection scope of the claims of the present disclosure.

What is claimed is:

1. An optical fiber laser induced breakdown spectroscopy (LIBS) detection device, comprising:
   an optical fiber LIBS detector configured to enter a pipeline and perform detection in the pipeline; and
   a master control detection system,
   wherein the optical fiber LIBS detector comprises an optical fiber LIBS probe;
   wherein the optical fiber LIBS probe comprises a probe external cavity and a probe internal cavity; a tail portion of the probe external cavity and a tail portion of the probe internal cavity are connected and fixed through a threaded structure; an external regulator is provided at a head portion of the probe external cavity; an internal regulator is provided at a head portion of the probe internal cavity; an optical fiber connector is installed at the tail portion of the probe internal cavity, and a probe plano-convex lens is fixedly installed in the internal regulator through a snap ring; an external stop ring is provided between the external regulator and the probe external cavity, and an internal stop ring is provided between the internal regulator and the probe internal cavity; two air nozzles are symmetrically arranged on a side surface of the external regulator; and
   the optical fiber connector, the probe plano-convex lens and the external regulator are arranged on a same optical path, and centers of the optical fiber connector, the probe plano-convex lens and the external regulator are located on a same straight line; and the probe plano-convex lens has a diameter of 25.4 mm and an focal length of 16 mm.

2. The optical fiber laser induced breakdown spectroscopy detection device according to claim 1, wherein the at least one moving component comprises two lateral driving wheels and two driven wheels, each of the two lateral driving wheels is provided with a side wheel driving mechanism thereon; each of the two lateral driving wheels and the two driven wheels is connected to a bottom plate of the lifting driving mechanism through a wheel telescopic rod; a forward distance sensor is installed at a front end of the bottom plate of the lifting driving mechanism, and a lateral distance sensor is mounted on a side surface of the bottom plate.

3. The optical fiber laser induced breakdown spectroscopy detection device according to claim 1, wherein openings of the two air nozzles are opposite to each other, and the two air nozzles are connected with a same air bottle and a same regulating valve; airflows from external air pipes have a same flow rate and confront each other at a central position inside the external regulator, the speed of the airflows is buffered at the central position, and the airflows move along an axial direction of the external regulator in such a manner that a position where laser light is focused on an inner surface of a pipeline to be detected is in a gaseous medium environment; and the external regulator is provided with an opening of 90° in a direction perpendicular to a straight line where the two air nozzles are located in such a manner that air in the external regulator overflows from the opening.

4. The optical fiber laser induced breakdown spectroscopy detection device according to claim 1, wherein the master control detection system comprise a nanosecond laser, and a first beam splitter, a second beam splitter and a dichroic mirror that are sequentially arranged along an output light path of laser light of the nanosecond laser; the laser light is reflected by the dichroic mirror and then enters an optical fiber coupler, is focused by a first plano-convex lens of the optical fiber coupler and transmitted in the transmission optical fiber, and then enters the optical fiber LIBS detector to be focused on a pipeline to be detected; plasma emission photons generated after laser focusing and shooting are emitted along a reversible optical path, a laser output end of the transmission optical fiber becomes a photon input end, and a laser input end of the transmission optical fiber becomes a photon output end in such a manner that photon beams are emitted from the photon output end of the transmission optical fiber and become parallel light through the first plano-convex lens, the parallel light is transmitted through the dichroic mirror, focused into a collecting optical fiber through the second plano-convex lens and is then input into a spectrometer through the collecting optical fiber; the spectrometer is electrically connected to a computer interacting with a control module, and the control module is connected to the optical fiber LIBS detector through the control signal line;

a photoelectric detector is provided on a reflected light path of a first beam splitter and electrically connected to an oscilloscope, and the oscilloscope is electrically connected to an ICCD; a laser energy meter is provided on a reflected light path of a second beam splitter; and each of the nanosecond laser, the ICCD and the spectrometer is connected to a programmable pulse delay generator.

5. The optical fiber laser induced breakdown spectroscopy detection device according to claim 4, wherein the transmission optical fiber is a multimode optical fiber coated with high temperature-resistant polyimide, and a protective tube for packaging the multimode optical fiber is made of a stainless steel material, and the transmission optical fiber has an outer diameter of 6 mm, a core diameter of 600 μm, a numerical aperture of 0.22, a cladding diameter of 660 μm, and a coating diameter of 710 μm, a wavelength range of transmittable laser ranging from 185 nm to 1100 nm, and a maximum power density of 1 $GW/cm^2$; and the collecting optical fiber is a silica-clad multimode optical fiber with a length of 1 m, a core diameter of 400 μm and a numerical aperture of 0.22.

6. The optical fiber laser induced breakdown spectroscopy detection device according to claim 4, wherein the telescopic mechanism is installed at a center of a turntable of the rotational mechanism, and the telescopic mechanism is driven to rotate on an xOz plane by controlling the rotational mechanism in such a manner that detection work in different directions at a same position in the pipeline to be detected is satisfied; the rotation stopper is installed just below the turntable of the rotation mechanism; each of a radial distance sensor, a lateral distance sensor and a forward distance sensor is a high-frequency ultrasonic probe; each of the side wheel driving mechanism, the lifting driving mechanism, the rotational mechanism and the telescopic mechanism is sealed and packaged with the stainless steel material; and other structures of the optical fiber LIBS detector are all made of the stainless steel material.

7. An optical fiber laser induced breakdown spectroscopy detection method using the detection device according to claim 4, comprising:

step 1 of adjusting detector;

step 2 of positioning the detector; and step 3 of analyzing and processing detection, wherein said adjusting detector comprises: firstly, selecting an external regulator with appropriate size and model based on a nominal inner diameter of the pipeline to be detected; adjusting lengths of four wheel telescopic rods, and adjusting an included angle between a plane of the bottom of the lifting platform and each of the four wheel telescopic rods located at both sides, in such a manner that two lateral driving wheels and two driven wheels closely fit with an inner wall of the pipeline to be detected; judging whether values measured by two lateral distance sensors are the same or not, and if not, further adjusting the four wheel telescopic rods until the values measured by the two lateral distance sensors are the same and the optical fiber LIBS detector is located at a central position of the pipeline in an X direction; elongating the telescopic mechanism in such a manner that the optical fiber LIBS detector closely fits with the inner wall surface just above the pipeline to be detected; setting the nanosecond laser in an internal trigger working mode, setting a gate width and a time delay of the ICCD on the computer, and observing whether an intensity of collected element characteristic line radiation spectrum is maximum or not; if not, adjusting an object distance by adjusting a position of an internal regulator in a probe internal cavity, and adjusting an image distance by finely adjusting a position of an external regulator in a probe external cavity, repeating these steps for multiple times until an element spectral line with a maximum intensity is observed, and fixing the internal regulator and the external regulator;

wherein said positioning the detector comprises: controlling, by the computer, the lifting platform to go upward and downward by the computer, and controlling the lifting platform to go upward when a value measured by one of the two lateral distance sensors is smaller than a value measured by the radial distance sensor, and controlling the lifting platform to go downward when a value measured by the lateral distance sensor is larger than the value measured by the radial distance sensor, in such a manner that the optical fiber LIBS detector is located in a center of the pipeline in a Z direction and a center of a turntable of the rotational mechanism is located at the center of the pipeline to be detected; remotely controlling, by of the computer, the illuminating lamp to be turned on, adjusting the telescopic rod to elongate or contract, and automatically adjusting a focal length of a camera by the computer, in such a manner that an image of the inner wall of the pipeline to be detected is clearly observed on the computer; setting rotating speeds of two side wheel driving mechanisms to be the same, and controlling the optical fiber LIBS detector to linearly advance along the inner wall of the pipeline to be detected; setting a proper turning threshold in a control program of a computer, and when a value measured by a forward distance sensor is smaller than the turning threshold, determining that the optical fiber LIBS detector enters a turning section of the pipeline to be detected; at this moment, if a value measured by a left one of the two lateral distance sensors is greater than a value measured by a right one of the two lateral distance sensors, setting, by a program of the computer, that the rotating speed of a right one of the two side wheel driving mechanisms is greater than the rotating speed of a left one of the two side wheel driving mechanisms, in such a manner that the optical fiber LIBS detector turns left, and vice versa; controlling the optical fiber LIBS detector to advance in the pipeline to be detected until the detector reaches a position to be detected of the inner wall of the pipeline, controlling, by the computer, the rotational mechanism to rotate and to drive the camera located on the telescopic mechanism to rotate on an xOz plane until an area to be detected falls in a middle of an image captured by the camera, and tuning off the illuminating lamp; manipulating the rotational mechanism to rotate at a fixed angle in such a manner that the optical fiber LIBS probe is rotated to a position where the camera is located, and adjusting the telescopic rod to extend until the external regulator closely fits with the inner wall of the pipeline to be detected and the area to be detected is just in a middle of a contact curved surface;

wherein said analyzing and processing detection comprises: setting the nanosecond laser in an external trigger working mode, and controlling light emission of the nanosecond laser and a door opening signal of the ICCD by setting parameters of the programmable pulse delay generator; opening an air pipe switch and a regulating valve, in such a manner that medium air flows fill a required air medium into the optical fiber LIBS probe through two opposite air nozzles; sampling, by the spectrometer, environmental background spectrum before each measurement of the pipeline to be detected; in each measurement, emitting, by the nanosecond laser, 50 laser pulses at a frequency of 1 Hz, and transmitting the plasma spectrum that is generated every time when the laser breaks down the area to be detected of the inner wall of the pipeline to be detected, to the spectrometer through the optical path; automatically accumulating, by the spectrometer, the collected 50 plasma luminescence spectra, and displaying them on the computer, automatically comparing obtained spectrum data with NIST standard spectrum database by a software, analyzing and obtaining types and spectral line intensities of elements in the area to be detected, selecting elements to be quantitatively analyzed, and automatically selecting, by the software, corresponding optimal available characteristic spectral lines, and modelling a calibration curve by combining with optical fiber LIBS standard sample databases of the nuclear power plant to determine contents of the elements in the area to be detected.

\* \* \* \* \*